(12) United States Patent
Sanderson et al.

(10) Patent No.: US 12,441,187 B2
(45) Date of Patent: Oct. 14, 2025

(54) VEHICLE SPOTTER DRONE

(71) Applicant: Rivian IP Holdings, LLC, Plymouth, MI (US)

(72) Inventors: Charles Sanderson, Newport Beach, CA (US); Vivek Vaid, Mountain View, CA (US); Quentin Spottiswoode, Horsham (GB)

(73) Assignee: Rivian IP Holdings, LLC, Plymouth, MI (US)

( * ) Notice: Subject to any disclaimer, the term of this patent is extended or adjusted under 35 U.S.C. 154(b) by 51 days.

(21) Appl. No.: 17/990,439

(22) Filed: Nov. 18, 2022

(65) Prior Publication Data

US 2024/0166047 A1    May 23, 2024

(51) Int. Cl.
*B60K 35/28*        (2024.01)
*B64U 20/87*        (2023.01)
*B60K 35/22*        (2024.01)
*B64U 101/30*       (2023.01)

(52) U.S. Cl.
CPC ............. *B60K 35/28* (2024.01); *B64U 20/87* (2023.01); *B60K 35/22* (2024.01); *B60K 2360/176* (2024.01); *B64U 2101/30* (2023.01); *B64U 2201/10* (2023.01)

(58) Field of Classification Search
CPC .. B60K 35/00; B60K 35/28; B60K 2360/176; B60K 35/22; B64U 20/87; B64U 2201/10; B64U 2101/30
See application file for complete search history.

(56) References Cited

U.S. PATENT DOCUMENTS

| 11,006,263 | B2 * | 5/2021 | Ferreira | B64U 10/13 |
| 12,367,788 | B2 * | 7/2025 | Nakazawa | G09B 9/085 |
| 2011/0068224 | A1 * | 3/2011 | Kang | B64U 80/25 244/116 |
| 2015/0102154 | A1 * | 4/2015 | Duncan | B64U 80/86 701/300 |
| 2015/0321758 | A1 * | 11/2015 | Sarna | B64U 70/50 244/63 |

(Continued)

FOREIGN PATENT DOCUMENTS

| DE | 102011106170 A1 * | 2/2012 | G08G 1/0962 |
| WO | WO-2017157863 A1 * | 9/2017 | B60P 3/11 |

OTHER PUBLICATIONS

White, J. "Polestar's New EV Concept Comes With a Boomerang Drone?", Gear, Mar. 2, 2022, 7 pages, online available at https://web.archive.org/web/20220302121004/https://www.wired.com/story/polestar-o2-ev-concept-drone/.

*Primary Examiner* — Justin S Lee
(74) *Attorney, Agent, or Firm* — Haley Guiliano LLP

(57) ABSTRACT

A visual guidance system may include a drone having a sensor. The drone may be configured to autonomously position the sensor outside a vehicle with a line of sight to a current path of the vehicle to collect path data. The visual guidance system may also include a controller in communication with the sensor and configured to provide visual guidance to a vehicle operator based on the path data. Example methods of providing visual guidance may include autonomously positioning a sensor outside a vehicle using a drone such that the sensor has a line of sight to a current path of the vehicle to collect path data. Example methods may also include using a controller to determine visual guidance from the path data and provide the visual guidance to a vehicle operator.

19 Claims, 8 Drawing Sheets

(56) References Cited

U.S. PATENT DOCUMENTS

| | | | |
|---|---|---|---|
| 2016/0016663 A1* | 1/2016 | Stanek | G08C 17/00 |
| | | | 701/3 |
| 2018/0120847 A1* | 5/2018 | Chen | G05D 1/0094 |
| 2018/0251234 A1* | 9/2018 | Wang | B64U 80/86 |
| 2019/0051169 A1* | 2/2019 | Gomez Gutierrez | |
| | | | G08G 1/0965 |
| 2019/0171201 A1* | 6/2019 | Tao | H04N 23/71 |
| 2019/0377345 A1* | 12/2019 | Bachrach | G06V 20/17 |
| 2020/0020231 A1* | 1/2020 | Dhiman | G08G 1/163 |
| 2021/0218935 A1* | 7/2021 | Sato | B64U 10/13 |
| 2022/0302995 A1* | 9/2022 | Mirzai | B60R 25/305 |

\* cited by examiner

VEHICLE SPOTTER DRONE

INTRODUCTION

The present disclosure is directed to a visual guidance system, and more particularly to a visual guidance system for a vehicle employing a drone or other unmanned aerial vehicle (UAV).

SUMMARY

Off road maneuvers in a vehicle may require the assistance of a spotter outside the vehicle. For example, when traversing extreme terrain, e.g., large rocks or significant inclines or declines, a driver may not be able to see areas immediately surrounding the vehicle. Accordingly, a spotter may stand outside the vehicle with a view of the areas of the terrain that cannot be directly seen by the driver. The spotter may signal the driver, e.g., with hand gestures or the like, to help the driver guide the vehicle to traverse the terrain. A spotter may be needed to assist the driver when particularly extreme or challenging terrain is encountered, e.g., tight rock formations, large boulders, etc. Some off-road vehicles have, in an effort to address the inability of the driver to see certain areas of the terrain, been provided with underbody cameras for directly viewing the terrain. Merely providing views of the terrain taken directly from the vehicle, however, may not provide adequate views of the vehicle's path, e.g., particularly where front and rear wheels of the vehicle are in contact with the ground surface(s). Some vehicles use a surrounding view of a vehicle with cameras along the outside/body of the vehicle, artificially generating a "360-degree" view of vehicle, and may also provide a projected path for vehicle tires. The field of view from these perspectives is limited to areas that are within a few inches or, at most, a few feet from the vehicle. Moreover, even when the vehicle can provide views of areas surrounding a vehicle or an underneath the vehicle, the driver may have difficulty determining a best path for the vehicle over/around obstacles.

Accordingly, in at least some example approaches, a visual guidance system is provided comprising a drone having a sensor. The drone may be configured to autonomously position the sensor outside a vehicle with a line of sight to a current path of the vehicle to collect path data. The visual guidance system may also include a controller in communication with the sensor and configured to provide visual guidance to a vehicle operator based on the path data.

In at least some example approaches, the visual guidance includes a direction to guide the vehicle.

In at least some example illustrations, the drone further comprises a display configured to provide the visual guidance to the vehicle operator from outside the vehicle.

In at least some examples, the drone is configured to autonomously position the display within a field of view of the vehicle operator.

In at least some example approaches, the visual guidance includes an image of the current path and a representation of a desired path overlaid upon the image.

In at least some examples, the visual guidance system further comprises a display installed within the vehicle, the display configured to provide the visual guidance to the vehicle operator.

In at least some examples, the current path includes a contact between one or more tires of the vehicle and a surface being traversed by the vehicle.

In at least some examples, the drone is configured to autonomously maintain the sensor with the line of sight to the current path in response to movement of the vehicle along the current path.

In at least some example illustrations, the vehicle is configured to determine a position of the drone and provide positioning instructions to the drone in response to the determined position of the drone. The positioning instructions may include a position of the vehicle and/or a position of one or more drone obstacles detected by the vehicle.

In at least some example approaches, the controller is configured to determine the visual guidance based upon one or more of a position of a contact patch of one or more tires of the vehicle, an orientation of the contact patch, a direction of the one or more tires, a steering angle of the vehicle, or a vehicle orientation.

In at least some examples, the path data includes one or more images of the current path.

According to another example illustration, a visual guidance system is provided comprising a drone having a sensor and a drone display. The drone may be configured to autonomously position itself outside a vehicle such that the sensor has a line of sight to a current path of one or more tires of the vehicle to collect path data and the drone display has a line of sight to an operator position within the vehicle. The visual guidance system may also include a controller in communication with the sensor and configured to provide visual guidance based on the path data. The controller may be configured to provide a first representation of visual guidance from outside the vehicle via the drone display, and to provide a second representation of the visual guidance inside the vehicle via an interior vehicle display.

In at least some example illustrations, the drone is configured to autonomously maintain the sensor with the line of sight to the current path in response to movement of the vehicle.

In at least some examples, the visual guidance includes a direction to guide the vehicle from the current path to a desired path.

According to another example illustration, a method is provided comprising autonomously positioning a sensor outside a vehicle using a drone such that the sensor has a line of sight to a current path of the vehicle to collect path data and, using a controller, determining visual guidance from the path data and providing the visual guidance to a vehicle operator.

At least some example methods further comprise providing the visual guidance to the vehicle operator from outside the vehicle using a display of the drone.

In at least some example illustrations, the method further includes autonomously positioning the display within a field of view of the vehicle operator.

In at least some example approaches, the method further includes providing the visual guidance to the vehicle operator using a display installed within the vehicle.

In at least some examples, the method further comprises autonomously maintaining the sensor with the line of sight to the current path in response to movement of the vehicle along the current path.

In at least some example methods, the visual guidance is determined based upon one or more of a position of a contact patch of one or more tires of the vehicle, an orientation of the contact patch, a direction of the one or more tires, a steering angle of the vehicle, or a vehicle orientation.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

In example illustrations herein, information about a vehicle path from a "third-person" perspective of the vehicle, e.g., from outside the vehicle, may be provided to enhance guidance of the vehicle. In at least some examples, a drone may have sensor(s), a camera, or the like to provide information and/or images. Accordingly, the need of another person to serve as a "spotter" outside the vehicle, e.g., during off-road or extreme maneuvers, is reduced or eliminated entirely.

Generally, the drones provided in examples herein may be any unmanned aerial vehicle (UAV). Example drones illustrated herein are shown as a quadcopter, i.e., having four rotors for facilitating flight and hovering of the drone. However, the drone may have any configuration capable of facilitating flight and hovering, e.g., for positioning the drone stably outside the vehicle. Accordingly, the drone may generally provide information about a vehicle path and/or terrain surrounding the vehicle, e.g., in the form of images or directions for guiding the vehicle and/or an operator of the vehicle. As discussed in further detail below, example guidance systems may employ a drone to provide image data and other information to assist a vehicle operator with positioning a tire patch of one or more wheels of the vehicle, facilitating the operator maneuvering the vehicle through tight spaces, e.g., rocks or other obstacles.

Figure 1:
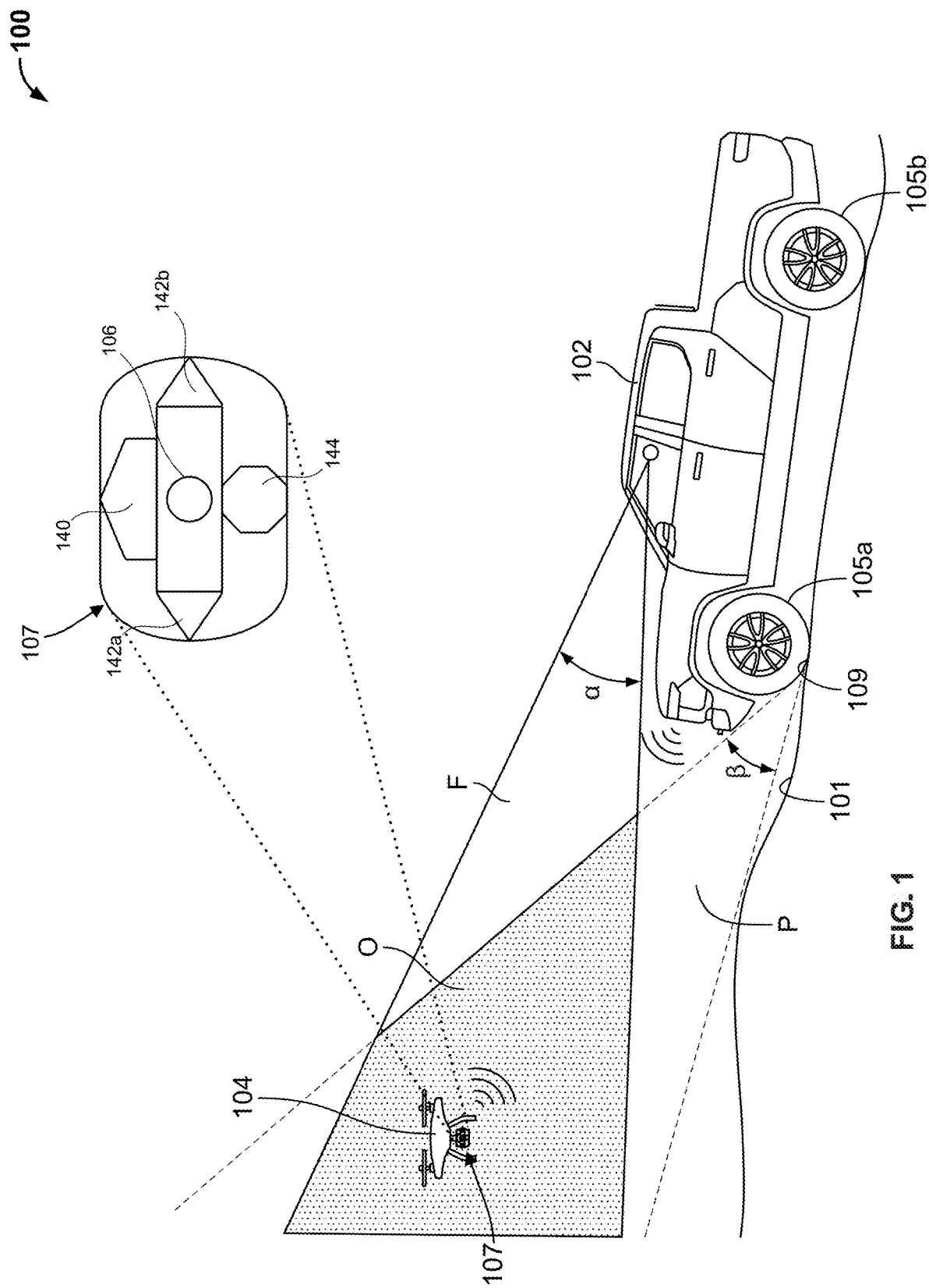
FIG. 1 shows a guidance system including a drone for providing guidance to a vehicle, in accordance with some embodiments of the present disclosure.

Referring now to FIG. 1, an example visual guidance system 100 is illustrated comprising a vehicle 102 and a drone 104. The drone 104 may have one or more sensors 106. In at least some examples, the sensor 106 is a camera or any other device capable of providing imaging or other information regarding position of the drone 104 and/or vehicle 102 in relation to a terrain 101 being traversed by the vehicle 102. Merely as examples, sensor(s) 106 may employ RADAR, LIDAR, SONAR, or the like to detect a position of terrain 101, distance between sensor 106 and features of the terrain 101, etc. Moreover, the sensor 106 may include multiple devices or sensors, e.g., a camera for collecting image/video in addition to along with LIDAR sensors for determining distance to the terrain 101. Accordingly, sensor(s) 106 of the drone 104 may be configured to collect path data describing terrain 101 in three dimensions, to collect images of the terrain 101, and to collect positional information with respect to terrain 101 in relation to the vehicle 102. Merely by way of example, a camera included in the sensor 106 may collect path data in the form of images or video of terrain 101, while LIDAR sensors of the drone 104 and/or the vehicle 102 may provide positional information regarding obstacles or the like in three-dimensions with respect to the drone 104 and/or the vehicle 102. Further, the sensor 106 may also be configured to gather path data in varied conditions such as low lighting or darkness.

Generally, the drone 104 may be employed to obtain path data relating to the terrain 101 being traversed by the vehicle 102. The vehicle 102 may additionally collect path data using sensors, cameras, or the like. As the drone 104 is configured to be positioned away from the vehicle 102 as illustrated in FIG. 1, the sensor 106 may generally capture path data that may otherwise be unavailable from the perspective of the vehicle 102 and sensors thereof. Merely by way of example, cameras or other sensors installed on the vehicle 102 may be incapable of obtaining path data regarding the terrain 101 to the extent there are obstacles blocking a line of sight from the cameras/sensors installed on the vehicle 102 to the obstacles, or the fixed perspective of the cameras/sensors installed on the vehicle 102 from being provided adequate line of sight.

As noted above, the drone 104 may include any unmanned aerial vehicle (UAV) that is convenient. Generally, the drone 104 may be configured to autonomously position the sensor 106 outside vehicle 102 to obtain path data for the terrain 101. As illustrated generally in FIG. 1, the drone 104 is configured to position the sensor 106 with a line of sight to a current path of the vehicle 102 to collect path data. Accordingly, path data may be collected by the drone 104 and/or sensor 106, and provided to an operator of the vehicle 102. As illustrated in FIG. 1, the drone 104 may be configured to hover or otherwise position the sensor 106 with an unobstructed line of sight to the terrain 101 in relevant areas immediately around the vehicle 102. For example, the drone 104 may position sensor 106 with a line of sight to a contact patch 109 between one or more tires 105 of the vehicle 102 and the terrain 101, as represented by a path view P. The path view P may be defined, as illustrated in FIG. 1, by a view angle β from the contact patch 109 to areas around the vehicle 102, e.g., as delimited at a lower end by the terrain 101 and at an upper end by the vehicle 102. Accordingly, in this example the sensor 106 has a path line of sight as defined by path view P to a current path the tire(s) 105 of the vehicle 102 to collect path data. While the path view P is illustrated in two dimensions in FIG. 1, it should be understood that the path view P may generally project in three dimensions from relevant areas around the vehicle 102 to which it may be desirable for the drone 104 to have a line of sight to, e.g., contact patch 109, and as such the path view P and/or view angle β in different directions than the one illustrated in FIG. 1 may be different, e.g., due to obstructions from the vehicle 102, surrounding features such as rocks or trees, etc.

Generally, the drone 104 may be configured to position itself with respect to terrain 101 and/or vehicle 102 in any manner that is convenient. In an example, the drone 104 may be in communication with the vehicle 102, with the vehicle 102 providing information such as position of the vehicle 102 or components thereof, e.g., tires 105, orientation of the vehicle 102 including pitch and/or roll, merely as examples. The drone 104 may also be capable of communicating with positional sensors located on the vehicle 102 that facilitate the drone 104 monitoring position of the vehicle 102. The drone 104 may also be configured to determine a contour of terrain 101. In an example, sensor 106 may include LIDAR or other sensors configured to determine a position of the drone 104, e.g., elevation, relative to terrain 101, the existence of undulations, ruts, rocks or other obstacles, etc. Accordingly, the drone 104 may be configured to generally determine position of the drone 104 relative to the vehicle 102 and the terrain 101.

Path data may be provided to vehicle 102 and/or an operator of the vehicle 102 in any manner that is convenient. In an example, the system 100 generally provides path data via multiple displays, or from multiple places for perception by the operator of the vehicle 102. More specifically, system 100 may provide path data via one or more internal display(s) (not shown in FIG. 1) of the vehicle 102, as well as from displays provided outside the vehicle 102. For example, a display 107 may be integrated into the drone 104, e.g., as part of the sensor 106 mounted on the drone 104. To the extent the drone 104 maintains a position within a field of view F of the operator of the vehicle 102 (e.g., through a front windshield of the vehicle 102), the display 107 may be perceived by the operator of the vehicle 102. As illustrated in FIG. 1, the field of view F may be defined in part by a vertical viewing angle α, i.e., a viewing angle from a driver's perspective within the vehicle 102 as delimited by the vehicle 102. While the field of view F is illustrated in two dimensions projecting directly in front of the vehicle 102 in FIG. 1, it should be understood that the field of view F may generally project around the vehicle 102, e.g., around the entire vehicle 102, and may vary according to the view permitted outside the vehicle 102 in different directions from the driver's perspective. Merely as one example, the field of view F may have a relatively greater vertical viewing angle α through the driver's side window, resulting from the driver's relatively close proximity to the driver's side window, lack of obstruction of view from the hood of the vehicle 102, etc. By contrast, the field of view F may have a relatively smaller viewing angle α to the passenger side of the vehicle 102, to the rear of the vehicle 102, or when obstructions such as trees or the like are present around the vehicle 102. Accordingly, it should be understood that the field of view F and the vertical viewing angle α may vary about the vehicle 102. The display 107 may provide path data to the operator, e.g., in the form of directions or other information indicating to the operator regarding where/how to advance the vehicle 102 along the terrain 101. In an example, different types of visual information may be presented to an operator/driver of the vehicle 102 via the display 107 of the drone 104 and interior display(s) of the vehicle 102. Merely as one example, the display 107 of the drone 104 may indicate directions and/or colors to indicate a direction in which the vehicle 102 should be directed, e.g., left, right, forward, reverse with respect to obstacles or other features in the terrain 101. At the same time, display(s) within a cabin of the vehicle 102 may provide more detailed path data, e.g., images of the terrain 101 and/or obstacles seen by the sensor 106 of the drone 104. The path data provided by internal display(s) of the vehicle 102 may also include images of a desired path of the vehicle 102, e.g., in the form of a path for one or more tires of the vehicle 102 overlaid upon images of the terrain 101.

As noted above, the drone 104 may be positioned in any manner that is convenient. In at least some example approaches, the drone 104 may be positioned relative to the vehicle 102 as a function of (a) ability of the drone 104 to view terrain-vehicle interfaces (e.g., to contact patch 109 as defined by path view P), (b) ability of a driver/operator of the vehicle 102 to see the drone 104 (e.g., as defined by field of view F), and (c) avoidance of proximal objects that pose a risk to the drone 104 while in flight, e.g., trees or other objects above the terrain 101. Accordingly, in these example approaches the drone 104 may be positioned to have adequate visibility of the an interface between the vehicle 102 and the terrain 101, while enabling safe flight and remaining in view of a user, e.g., driver/operator of the vehicle 102. As will be discussed further below, in at least some example illustrations the drone 104 may be configured to maintain a position during use that is within the field of view F and also has an unobstructed line of sight to terrain 101 (e.g., including contact patch 109) as defined by the path view P. Accordingly, the drone 104 and a display 107 of the drone 104 has a an operator line of sight, e.g., as defined by the field of view F, to an operator position within the vehicle 102. In this manner, the sensor 106 may gather useful path data relating to the terrain 101, and the display 107 may provide the path data to the vehicle 102 and/or an operator of the vehicle 102.

Figure 2:
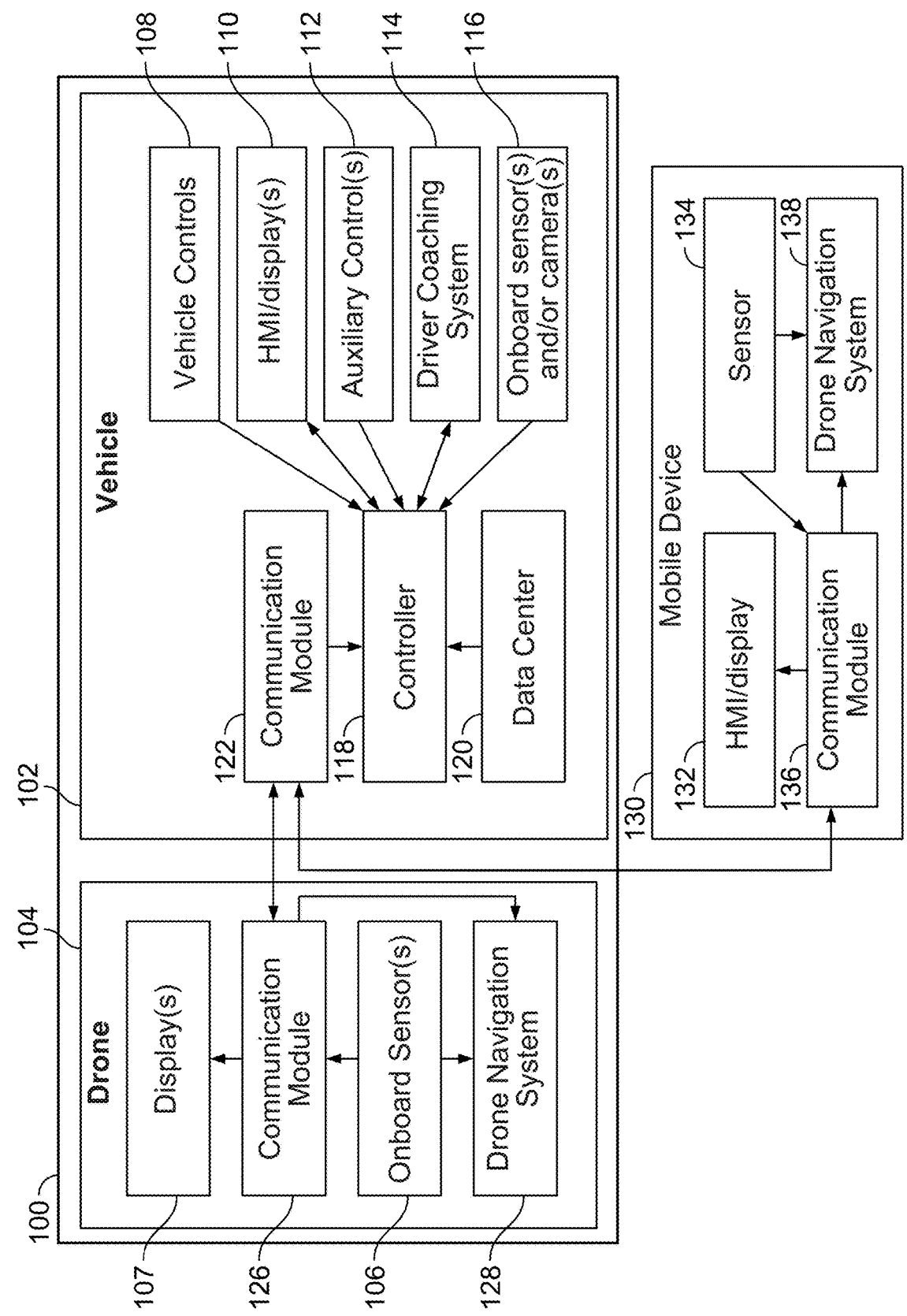
FIG. 2 shows a schematic illustration of the guidance system of FIG. 1, in accordance with some embodiments of the present disclosure.

Referring now to FIG. 2, visual guidance system 100 is illustrated and described in further detail. The vehicle 102 may be configured to communicate with and/or control the drone 104. As shown in FIG. 2, the vehicle 102 may include controls 108 and one or more displays 110. The display(s) 110, as will be described further below, may provide path data to a driver or operator of vehicle 102. Controls 108 may include any devices for controlling the vehicle 102 and guiding the vehicle 102 along terrain 101, e.g., a steering wheel, accelerator pedal, brake pedal, etc. The vehicle 102 may also include one or more auxiliary controls/switches 112, which may include buttons, switches, touchscreens, displays, or other devices configured to control aspects of the visual guidance system 100 and components thereof, e.g., drone 104, display 107, etc. In an example, auxiliary controls 112 include steering wheel controls or switches mounted upon a steering wheel of the vehicle 102 and are thereby relatively easily accessed by a driver of the vehicle 102 while navigating the vehicle 102. The vehicle 102 may also include one more displays 110. In an example, the display 110 is installed within a cabin of the vehicle 102 or otherwise configured to be used by an operator of the vehicle 102 while driving. The display(s) 110 may be configured to provide visual guidance to the vehicle operator, by displaying images or other visual representations of terrain 101, and/or instructions to an operator of the vehicle 102 such as directions to turn a steering wheel of the vehicle in a given direction and/or to a certain degree, to drive the vehicle forward or backward, to speed up, slow down, etc. The display(s) 110 may each be provided with a human-machine interface (HMI) for interacting with the display(s) 110. Moreover, aspects of the controls 108 and displays 110 may be combined, e.g., by way of a touchscreen interface. The vehicle 102 may also include onboard (vehicle) sensors 116. The sensors 116 may include distance sensors, cameras, or the like configured to gather path data regarding the terrain 101 being traversed by the vehicle 102 at a given time.

The vehicle 102 may also include a driver coaching system 114. The driver coaching system 114 may be configured to facilitate guidance of the vehicle 102, e.g., by analyzing path data collected by drone 104 and/or vehicle 102 to determine a desired path for the vehicle 102, and to implement step(s) for a driver of the vehicle 102 to undertake to traverse obstacles in the terrain 101. Merely by way of example, driver coaching system 114 may analyzing a position and/or size of one or more obstacles in the terrain 101, develop a desired path for the vehicle 102 to allow the vehicle 102 to travel around or over the obstacle(s), and to provide instructions to a driver of the vehicle 102 to guide the vehicle 102 along the desired path. This may include providing guidance such as to turn the steering wheel, drive the vehicle forward or backward, or the like, merely as examples. The driver coaching system 114 may be in communication with sensor(s) 116 gathering path data.

The vehicle 102 may also include a vehicle status and/or data center 120. Data center 120 may include a memory configured to store data, e.g., path data collected by sensor(s) 106 of the drone 104, sensor(s) 116 of the vehicle 102, or other components of the vehicle 102. Accordingly, the data center 120 may be in communication with the sensor(s) 106, drone 104, sensor(s) 116), and/or controller 118 to facilitate receipt of path data by the data center 120. Further, data or other information relating to the vehicle 102, e.g., a position of the vehicle 102, orientation such as pitch or roll of the vehicle 102, or the like may be stored at the data center 120. The data center 120 may also store data relating to a vehicle status, as well as map data or other information that may be convenient.

The vehicle 102 may also have a communication module 122. The communication module 122 may facilitate communication with devices, networks, etc. external to the vehicle 102. Merely by way of example, communication module 122 may include wireless communication devices such as a WiFi module, Bluetooth radio, or the like, as well as wired communication devices. Furthermore, the communication module 122 may have wireless communication devices for communicating with, providing/receiving path data, etc. with respect to the drone 104. For example, as discussed herein the vehicle 102 may receive path data collected by sensor(s) 106 from the drone 104. Additionally, the vehicle 102 may provide instructions to the drone 104, e.g., for directing or positioning the drone 104 for collection of path data.

The vehicle 102 may also include controller 118. The controller 118 may include one or more processors and one or more computer-readable mediums such that the controller 118 is configured to perform various step(s) of methods described herein. Controller 118 may include circuitry, e.g., including a processor and memory. A processor may comprise a hardware processor, a software processor (e.g., a processor emulated using a virtual machine), or any combination thereof. In some examples, a processor and a memory may be referred to in combination as control circuitry of vehicle 102. In some embodiments, a processor alone may be referred to as control circuitry of vehicle 102. A memory may comprise hardware elements for non-transitory storage of commands or instructions, that, when executed by a processor, cause the processor to operate the vehicle 102 in accordance with embodiments described above and below. Controller 118 and/or control circuitry of the vehicle 102 may be communicatively connected to components of vehicle 102 via one or more wires, or via wireless connection.

The drone 104 may include, as noted above, a display 107 configured to display information relating to path data collected by sensor(s) 106. The drone 104 may have a drone communication module 126, e.g., which may be configured to facilitate wireless communication of the drone 104, e.g., with the vehicle 102 and other components of the system 100. The drone 104 may also include a navigation system 128. Navigation system 128 may include hardware and software configured to facilitate flying the drone 104, e.g., accelerometers, gyroscopes, etc. for navigation as well as equipment for facilitating flying of the drone 104. Merely as examples, the navigation system 128 may include rotor(s) configured to provide lift and facilitate maneuvering of the drone 104 for collection of path data. The drone 104 may also be configured to detect objects near the drone 104 and/or the vehicle 102. Accordingly, navigation system 128 of the drone 104 be configured to facilitate the drone 104 avoiding obstacles such as trees or other elevated obstacles that may be encountered as the drone 104 flies in the vicinity of the vehicle 102 and/or to collect path data relating to the terrain 101.

A mobile device 130 may also interact with vehicle 102 and/or drone 104. In an example, the mobile device 130 may be used as a further display for a user, e.g., for a driver or passenger of the vehicle 102 while the drone 104 collects path data. The mobile device 130 may have a display and HMI, e.g., a touchscreen display configured to provide visual information such as images or video, as well as facilitate input from the user of the mobile device 130. The mobile device 130 may have a communication module 136, e.g., for facilitating wireless communication with vehicle 102 and/or drone 104. The mobile device 130 may also include sensors 134, e.g., cameras or the like configured to collect additional information relevant to assisting with navigation of the vehicle 102. The mobile device 130 may also include a drone navigation system 138, e.g., implemented as an application on the mobile device 130 that allows a user to control the drone 104 to navigate the drone 104 around terrain 101 and/or vehicle 102, and/or to collect path data such as images or video.

The vehicle 102 and drone 104 may be linked or otherwise may interact to facilitate collection of path data relating to terrain 101 being traversed by the vehicle 102. In some examples, the drone 104 may provide images, video, or other information to the vehicle 102, e.g., for displaying on the display 110 of the vehicle 102. The vehicle 102 may also facilitate manual control of the drone 104 or aspects of the drone 104. For example, a user in the vehicle 102 may manually navigate the drone 104, e.g., to position the drone 104 where desired. In examples herein, the drone 104 may be manually controlled via steering wheel-mounted or other auxiliary controls 112 of the vehicle 102, by a touchscreen display 110 of the vehicle 102, and/or via the mobile device 130. While manual control and/or navigation of the drone 104 may be permitted, in at least some examples the drone 104 may be configured to maintain a line of sight to the terrain 101, e.g., at contact patch 109, and also remain within a field of view F of the vehicle 102.

It should be noted that while the example system 100 illustrated in FIG. 2 is illustrated with controller 118 being installed to the vehicle 102, in other examples the controller 118 may be remote from the vehicle. In some examples, aspects of the controller 118 may be implemented in the drone 104 and/or the mobile device 130. Further, one or more aspects of the controller 118 may be distributed amongst the vehicle 102, drone 104, mobile device 130. Moreover, aspects of the controller 118 may be implemented remotely from the vehicle 102, drone 104, and mobile device 130, e.g., as part of a central office (not shown) in communication with the vehicle 102. In any case, the controller 118 is generally in communication with the sensor 106 of the drone 104, and may be configured to provide visual guidance to a vehicle operator based on the path data collected by the drone 104. Visual guidance, as noted above, may take any form that is convenient, e.g., directional arrows, colors, or other signals delivered via display 107 of the drone 104, or images or video delivered via display 110 of the vehicle 102.

Figure 3:
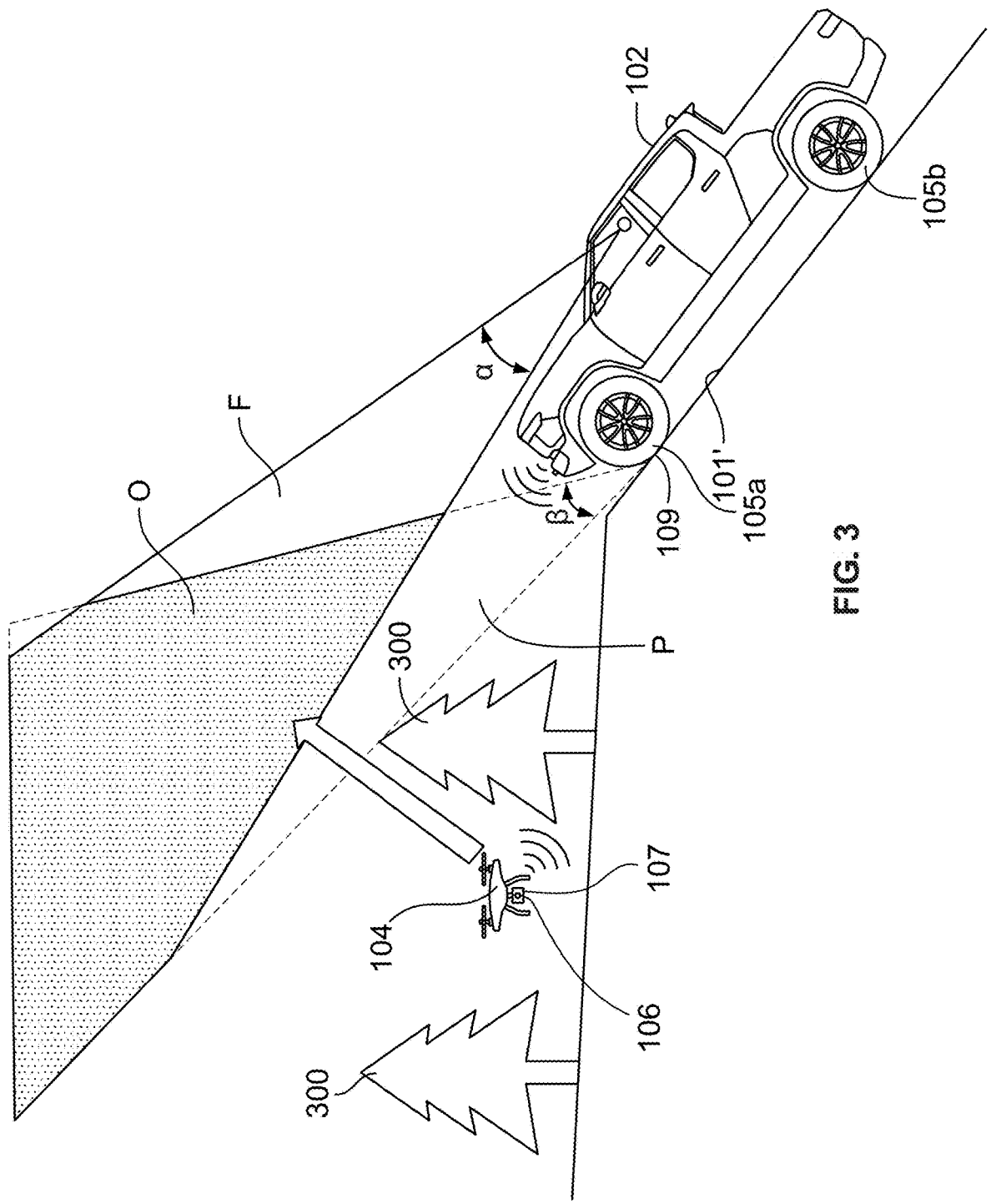
FIG. 3 shows a guidance system providing guidance to a vehicle traversing a hill, with a drone being temporarily out of a line of sight of a vehicle operator, in accordance with some embodiments of the present disclosure.

As mentioned above, during collection of path data it may be beneficial to maintain a position of the drone 104 such that the drone 104 is (a) within a field of view F of an operator of the vehicle 102 and also (b) positioned such that the sensor 106 has a line of sight to relevant areas of the terrain 101, e.g., at contact patch 109 between one or more tires 105 of the vehicle 102 and the terrain 101. The system 100 may also be configured to maintain the drone 104 within an overlap region O defined by an intersection between the field of view F and the path view P, and/or to navigate the drone 104 to the overlap region O when desired. As noted above, as the field of view F and the path view P each generally project in three dimensions around the vehicle 102, the overlap zone O may also project in three dimensions about the vehicle 102. Further, since the field of view F and path view P may each be different in other directions from the forward-view representation in two-dimensions shown in FIG. 1, the overlap zone O may also appear differently the other directions. Referring now to FIG. 3, the vehicle 102 is illustrated traversing an inclined terrain 101' approaching a wooded area defined by trees 300. With the position of the vehicle on the inclined terrain 101' and the resulting angle of the vehicle 102, the drone 104 is temporarily out of the field of view F of the vehicle 102. Additionally, the drone 104 may at times be moved away from the vehicle 102 and/or out of the field of view F, e.g., due to an operator of the vehicle 102 navigating the drone 104 further away from the vehicle 102, e.g., to obtain images or other information relating to terrain further away from the vehicle 102. Accordingly, it may be necessary to navigate the drone 104 back to the field of view F, e.g., to facilitate a driver of the vehicle 102 being able to perceive the display 107 of the drone 104 while navigating the inclined terrain 101'. The drone 104 may be directed to return to the field of view F as the vehicle 102 navigates the inclined terrain 101', allowing the display 107 to be perceived by the driver/operator of the vehicle 102. For example, the vehicle 102 may provide positioning information to the drone 104, e.g., regarding a position of the field of view F and/or the vehicle 102, such that the drone 104 may be navigated closer to the vehicle 102 to be positioned within the field of view F.

Figure 4:
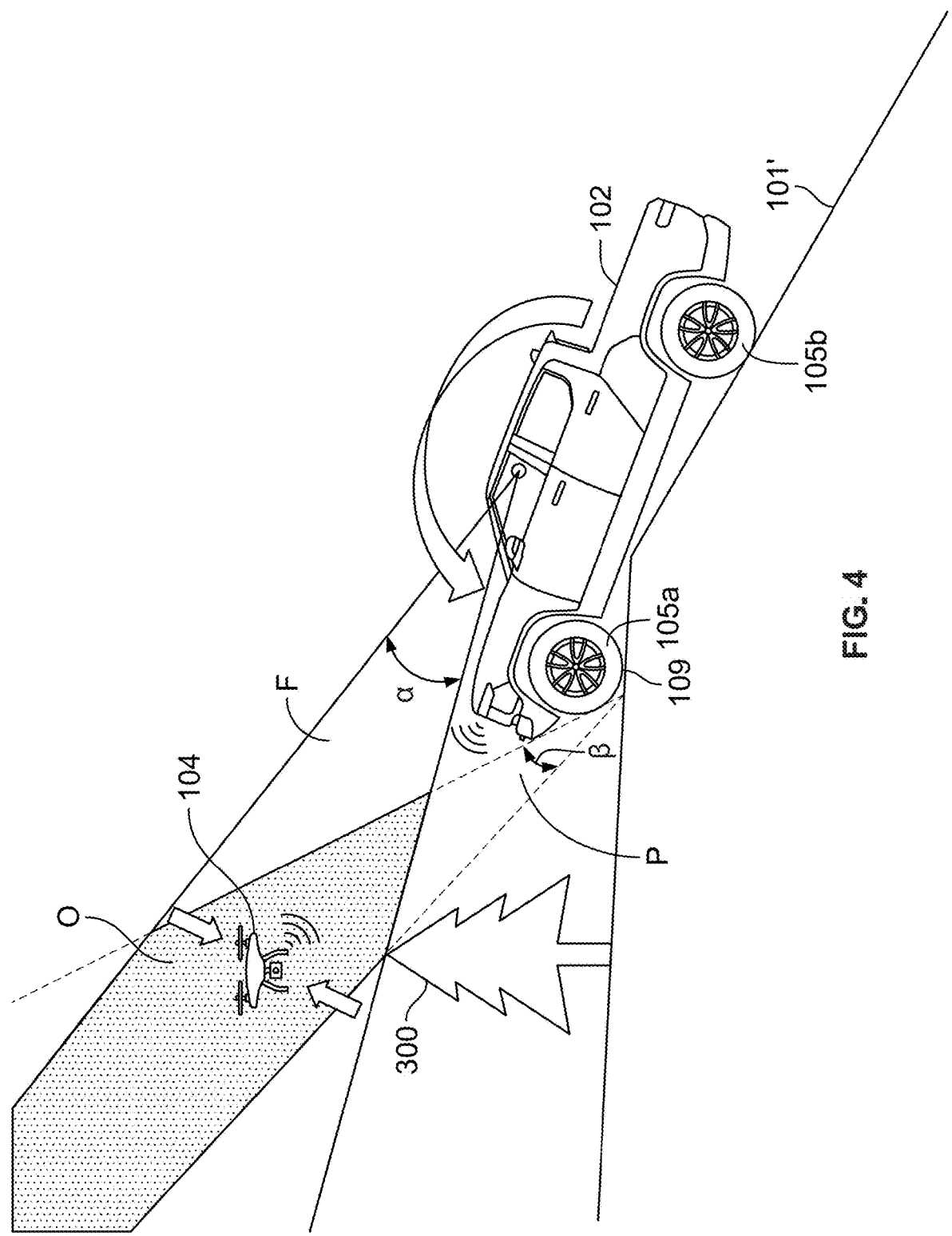
FIG. 4 shows a guidance system providing guidance to a vehicle traversing a hill, with a drone being positioned within a line of sight of a vehicle operator, in accordance with some embodiments of the present disclosure.

As also shown in FIG. 3, due to the inclined terrain 101' and a vertical extent of tree(s) 300, the path view P from a contact patch 109 between tires 105 and the inclined terrain 101' is relatively restricted. As a result, the drone 104 does not have an unobstructed line of sight to areas of the inclined terrain 101' near the vehicle 102, including the contact patch 109. Accordingly, as illustrated in FIG. 4 the drone 104 may be navigated to a different position, e.g., elevated further above the inclined terrain 101' and/or closer to the vehicle 102 such that the drone 104 is within the path view P and/or the overlap region O, as illustrated in FIG. 4. It should also be noted that the path view P and field of view F associated with the vehicle 102 may change as the vehicle 102 ascends the inclined terrain 101'. The drone 104 and/or the system 100 may generally provide guidance to the drone 104 to maintain the drone 104 within the field of view F, the path view P, and/or the overlap zone O. In at least some example approaches, navigation of the drone 104 in this manner may be undertaken by the controller 118 in an automated or autonomous manner, e.g., without requiring intervention by a driver/user of the vehicle 102. Accordingly, the drone 104 may in some examples autonomously align itself (or move to a position) such that the sensor 106 can "see" the contact patch 109. In this manner, the system 100 may facilitate third-person views of the contact patch 109 and other relevant areas around the vehicle, e.g., of the inclined terrain 101'.

As noted above, in some example approaches the drone 104 may be navigated autonomously to keep the drone 104 generally within a field of view F, path view P, and/or the overlap zone O associated with a vehicle 102 as the vehicle 102 is driven, e.g., along an inclined terrain 101'. At the same time, the system 100 may permit manual navigation of the drone 104 within a relevant boundary or area, e.g., within the field of view F, path view P, and/or the overlap zone O. For example, a driver or passenger of the vehicle 102 may navigate the drone 104 using steering wheel controls or a user interface of mobile device 130. Furthermore, it may also be possible for a driver/operator of the vehicle 102 adjust settings of the system 100, e.g., to change boundaries for autonomous navigation of the drone 104. Merely by way of example, the vehicle 102 may initially be traversing normal terrain 101, e.g., as illustrated in FIG. 1, with the system 100 set such that manual navigation of the drone 104 is permitted beyond the field of view F, path view P, and overlap zone O, e.g., to observe terrain 101 further away from the vehicle 102. Accordingly, the drone 104 may gather information regarding terrain or other areas further from the vehicle 102, e.g., to facilitate routing the vehicle. When positioned further away from the vehicle 102, the drone 104 may in some cases perform a forward-looking or "canary view" function under manual control of a user/driver of the vehicle 102. For example, the drone 104 may generally "fly ahead" on a trail and collect image or video from the perspective of the drone 104, or may perform rough topographic analysis. Based on this topographic analysis, which may be provided to the vehicle 102, controller 118 may update routing of the vehicle 102, a range estimate, etc. depending on characteristics of the terrain based on the path data collected by the drone 104. In an example, a relatively high average positive gradient or slope may result in a greater reduction in estimated remaining range, versus an average flat comparatively smaller gradient terrain. Additionally, the drone 104 may help vehicle 102 trigger a warning for potentially very difficult terrain. For examples, if a boulder height to crest ratio estimated from path data collected by drone 104 is too high for the vehicle 102 to safely traverse, controller 118 may generate a warning that is provided via display 110, audibly within the vehicle 102, etc.

Subsequently, one or more settings of the system 100 may be altered as the vehicle 102 encounters different terrain. For example, when the vehicle 102 encounters obstacles such as inclined terrain 101', settings or boundaries of the drone 104 may be altered such that the drone 104 remains within an area relatively close to the vehicle, e.g., within the field of view F, path view P, and/or overlap zone O. Accordingly, the drone 104 may provide accurate path data and assist an operator of the vehicle 102 in traversing more extreme obstacles such as rocks, trees, inclined terrain 101' relatively close to the vehicle 102. The system 100 may thus facilitate a driver or operator of the vehicle 102 prioritizing different capabilities of the system 100, e.g., such that the drone 104 is positioned to collect path data that is most beneficial to the driver.

In examples herein, the system 100 may employ path data obtained using the drone 104, information collected by the vehicle 102, and any other information convenient to develop routing directions or guidance to vehicle 102 and/or a driver of the vehicle 102. The controller 118 may be configured to determine visual guidance provided by way of the display 107 of the drone 104 and/or the display 110 of the vehicle 102 based upon a position of the contact patch 109 of one or more tires 105, an orientation of the contact patch 109, a direction of the one or more tires 105, a steering angle of the vehicle 102, and/or a vehicle orientation, e.g., a forward/aft angle (e.g., "pitch"), a side-to-side angle (e.g., "lean"), or yaw of the vehicle 102.

The vehicle 102 and drone 104 may interact in any manner that is convenient to provide visual guidance to a driver/operator of the vehicle 102. In an example, the vehicle 102 may employ sensor(s) 116 to determine a position of the drone 104, and/or airborne obstacles for the drone 104. For example, the vehicle 102 may have greater processing power available to determine a potential for contact or interference of obstacles with the drone 104, and as such it may be convenient for the vehicle 102 to communicate with the drone 104 to provide guidance information and prevent collision of the drone 104 with, e.g., trees 300. Additionally, the vehicle 102 may sense a position of drone 104, and may provide instructions to drone 104 to maintain a desired position of the drone 104 with respect to the vehicle 102. For example, as noted above it may be desired to maintain the drone 104 within the field of view F of a vehicle driver/operator, within a path view of the contact patch 109, and/or within an overlap zone O as illustrated above. Additionally, the drone 104 may employ its sensor(s) 106 to determine whether obstacles are present, and may report the obstacles to the vehicle 102. The vehicle 102, e.g., by way of controller 118, may in turn provide responsive instructions to the drone 104 based on the reported obstacles. For example, the vehicle 102 may instruct the drone 104 to gather additional information regarding the obstacle, e.g., to determine a size or magnitude of the obstacle in a desired direction or dimension, capture images of the obstacle, etc. Accordingly, in examples herein the vehicle 102 and/or the controller 118 may be configured to determine a position of the drone 104 and provide positioning instructions to the drone 104 in response to the determined position of the drone 104. The positioning instructions may include one or more of a position of the vehicle. Alternatively or in addition, the vehicle 102 may provide information to the drone 104 that is collected by sensor(s) 116 of the vehicle 102. Merely by way of example, where the vehicle 102 determines a position of one or more drone obstacles, e.g., trees 300, the vehicle 102 may provide positional information to the drone 104 to reduce or eliminate the potential for airborne collisions of the drone 104 with the detected drone obstacle(s).

Generally, system 100 may determine visual guidance for the vehicle 102 based upon path data collected by the drone 104 and/or vehicle 102 in any manner that is convenient. The drone 104 may collect path data, e.g., positional information regarding a position of objects such as rocks or other obstacles with respect to the drone 104, as well as positional information of the drone 104 relative to the vehicle 102. Accordingly, controller 118 may determine a position of the rocks/obstacles relative to the vehicle 102. Where obstacles are detected in the path of the vehicle 102, e.g., from image data collected by a camera and/or LIDAR sensors of the drone 104, or from sensors 116 of the vehicle 102, available path(s) around the obstacles may be determined by the controller 118. Available path(s) of the vehicle 102 may be determined based upon vehicle position, orientation, steering angle, or other characteristics of the vehicle 102 in real-time, in addition to path data such as a position of an obstacle in the terrain 101. In an example, controller 118 may determine that the vehicle 102 is going to contact a rock projecting upwards from the terrain 101. Based on a size and position of the rock determined from path data collected by the drone 104 and/or the vehicle 102, the controller 118 may determine a first path that the vehicle 102 can avoid the obstacle by turning the steering wheel/tires to the left, and a second path that the vehicle 102 can avoid the obstacle by turning the steering wheel/tires to the right.

Figure 5:
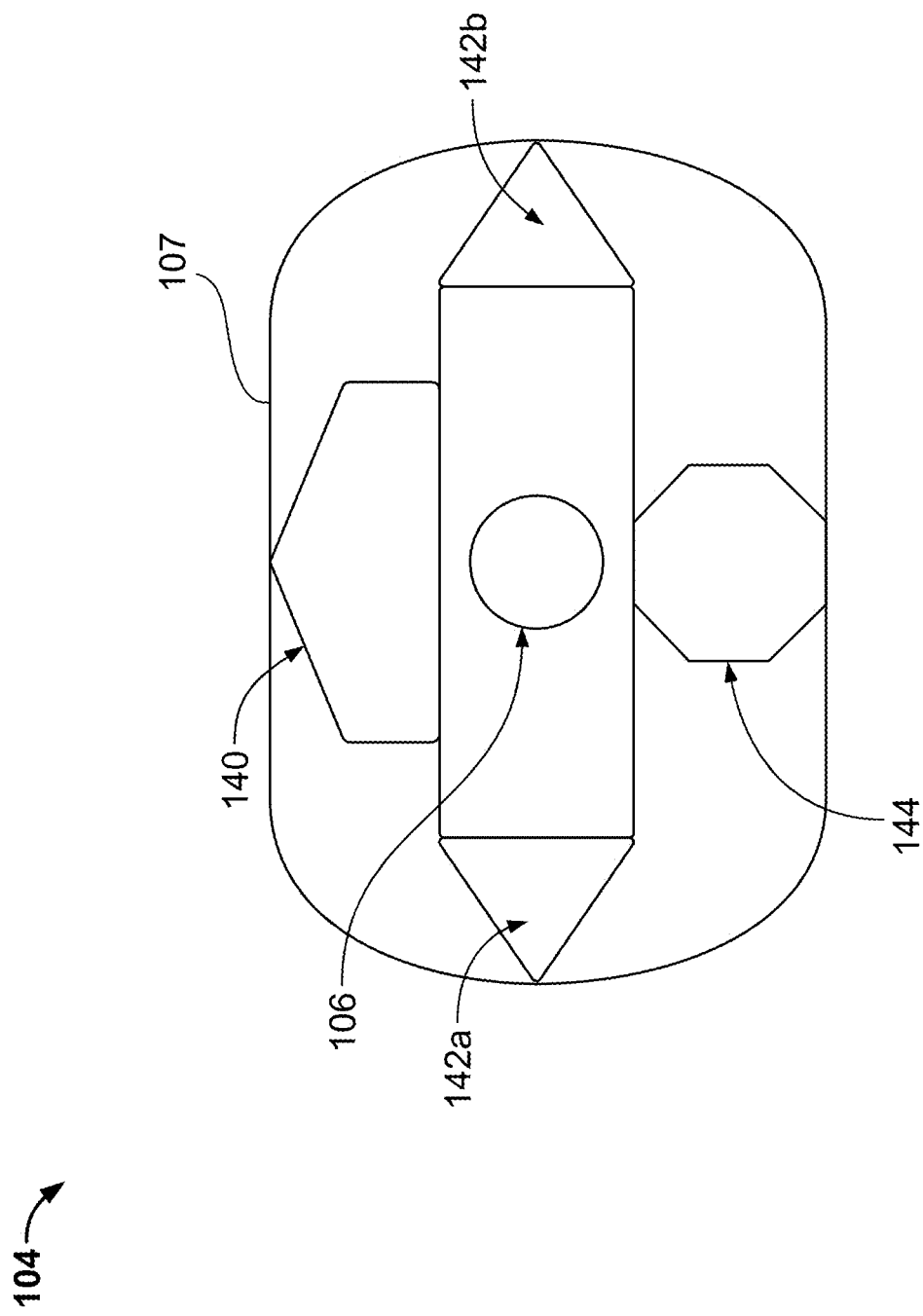
FIG. 5 shows a drone display of a guidance system, in accordance with some embodiments of the present disclosure.

Turning now to FIG. 5, the drone 104 is illustrated and described in further detail, in accordance with an example. As noted above, the drone 104 may generally be configured to provide visual cues to a driver/operator of the vehicle 102, e.g., by way of a display 107. In the example shown in FIG. 5, the display 107 is positioned on a front/forward-facing surface of the drone 104 on which the sensor/camera 106 is provided. Further, the display 107 may comprise directional lights or symbols that can be activated to indicate to a driver whether to go forward, turn the wheel left/right, stop, reverse the vehicle, etc. More specifically, a forward indicator 140, a steer left indicator 142a, a steer right indicator 142b, and a stop indicator 144 are provided for displaying directions, colors, and/or symbols representing a direction to turn vehicle 102 or to drive forward/backward, or stop. In at least some examples, an additional reverse light or indicator may be added in addition to the stop indicator 144, although a "reverse" signal may alternatively be provided by a different color/flashing applied via another of the indicators 140, 142, or 144 (e.g., by flashing stop indicator 144). Each of the indicators 140, 142, and 144 may have relatively bright lights, e.g., light-emitting diodes (LEDs) for providing highly visible directional signals or guidance to a driver of the vehicle 102. The drone 104 may thus activate appropriate indicators to provide visual guidance via the display 107 and/or indicators 140, 142, and 144 as the vehicle 102 traverses a terrain, e.g., terrain 101 and/or 101'. Accordingly, the system 100 may facilitate use of the object detection and path planning of the controller 118 and provide visual guidance to the driver of the vehicle 102.

Figure 6:
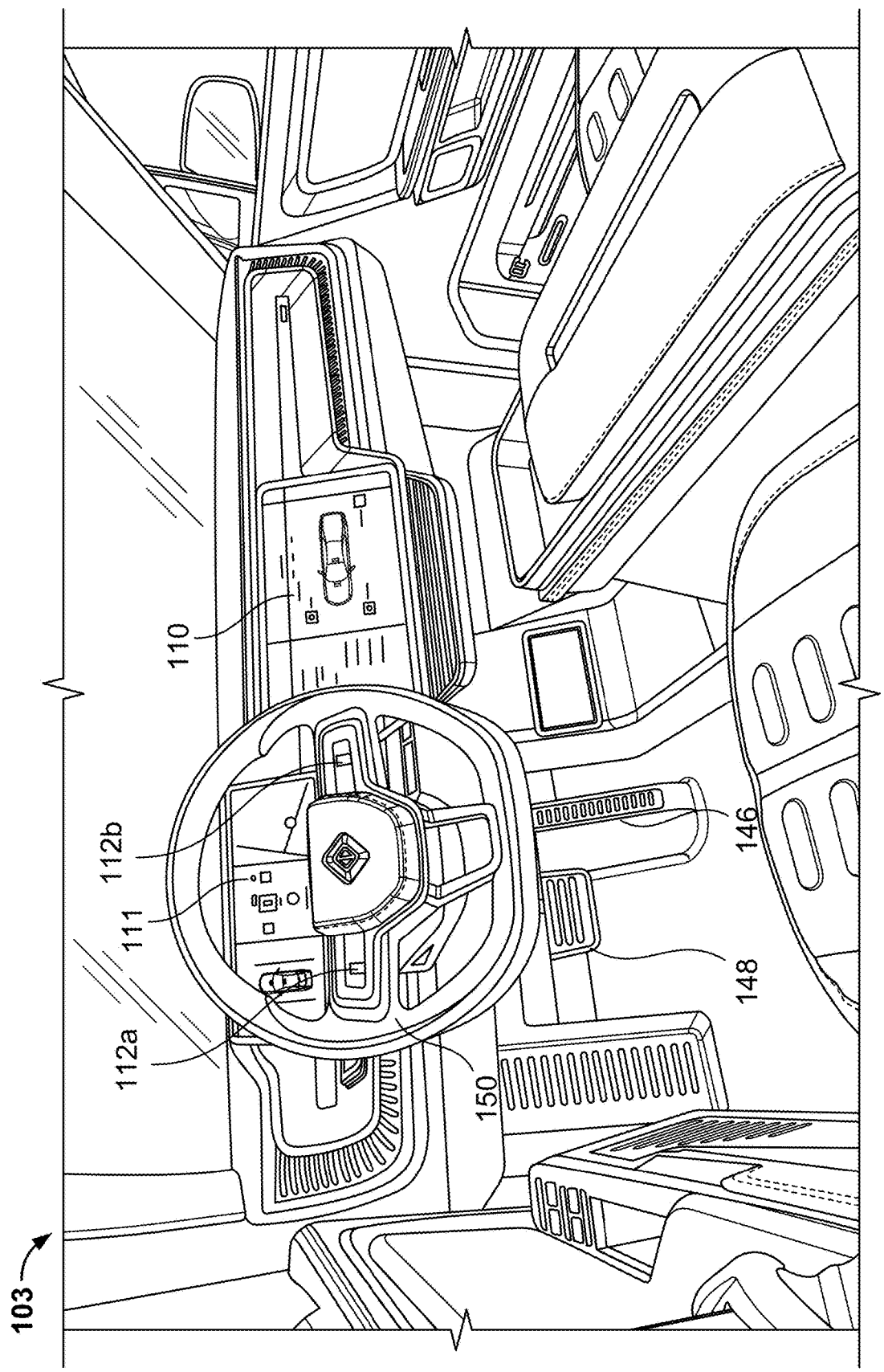
FIG. 6 shows an interior cabin of a vehicle, in accordance with some embodiments of the present disclosure.

Turning now to FIG. 6, an interior cabin 103 of vehicle 102 is illustrated and described in further detail, in accordance with an example approach. The interior 103 may include various controls for driving the vehicle 102, e.g., an accelerator pedal 146, brake pedal 148, and steering wheel 150. Additionally, as noted above auxiliary controls 112 may be provided for interacting with and/or controlling the drone 104. In the illustrated example, steering wheel controls 112a and 112b (collectively, 112) may be provided on either side of the steering wheel 150 to facilitate access to the controls by the driver while the vehicle 102 is being driven. The steering wheel controls 112 may include selection buttons, rollers, etc. to facilitate interaction with display 110 and/or to control drone 104 (e.g., to manually navigate drone 104, capture images, video, or other path data relating to terrain 101 using camera and/or sensor 106 of the drone 104). One or more of the controls, e.g., steering wheel controls 112, may be configured to provide feedback to a user/driver of the vehicle 102 via haptic feedback. For example, in an example where a driver of the vehicle 102 is controlling flight of the drone 104, one or both steering wheel controls 112 may vibrate in response to being urged in a direction or to an extent that the drone 104 would be flown beyond a desired area, e.g., outside of overlap zone O. The display 110, as noted above, may be a touchscreen configured to facilitate control of the drone 104, change settings, and/or to alter a function of the steering wheel controls 112 or other auxiliary controls 112 of the vehicle 102. An additional display 111 may be provided, e.g., to display speedometer and other gauges for driving the vehicle 102. The display 111 may also be used by system 100 to display aspects of drone 104, e.g., indicate a position of the drone relative to the vehicle 102, show images or video being captured by the drone 104, etc. In an example, a driver of the vehicle 102 may activate a control mode of the drone 104 using the display 110, in which the steering wheel controls 112 may be used to control altitude, roll, pitch, yaw, etc. of the drone 104. Accordingly, a driver/operator of the vehicle 102 may control a position of the drone 104. Moreover, manual control of drone 104 may be executed using the steering wheel buttons 112, allowing the driver to keep hands on the steering wheel 150 while driving and still obtain path data, e.g., a live video feed, from the vantage point of the drone 104.

Figure 7:
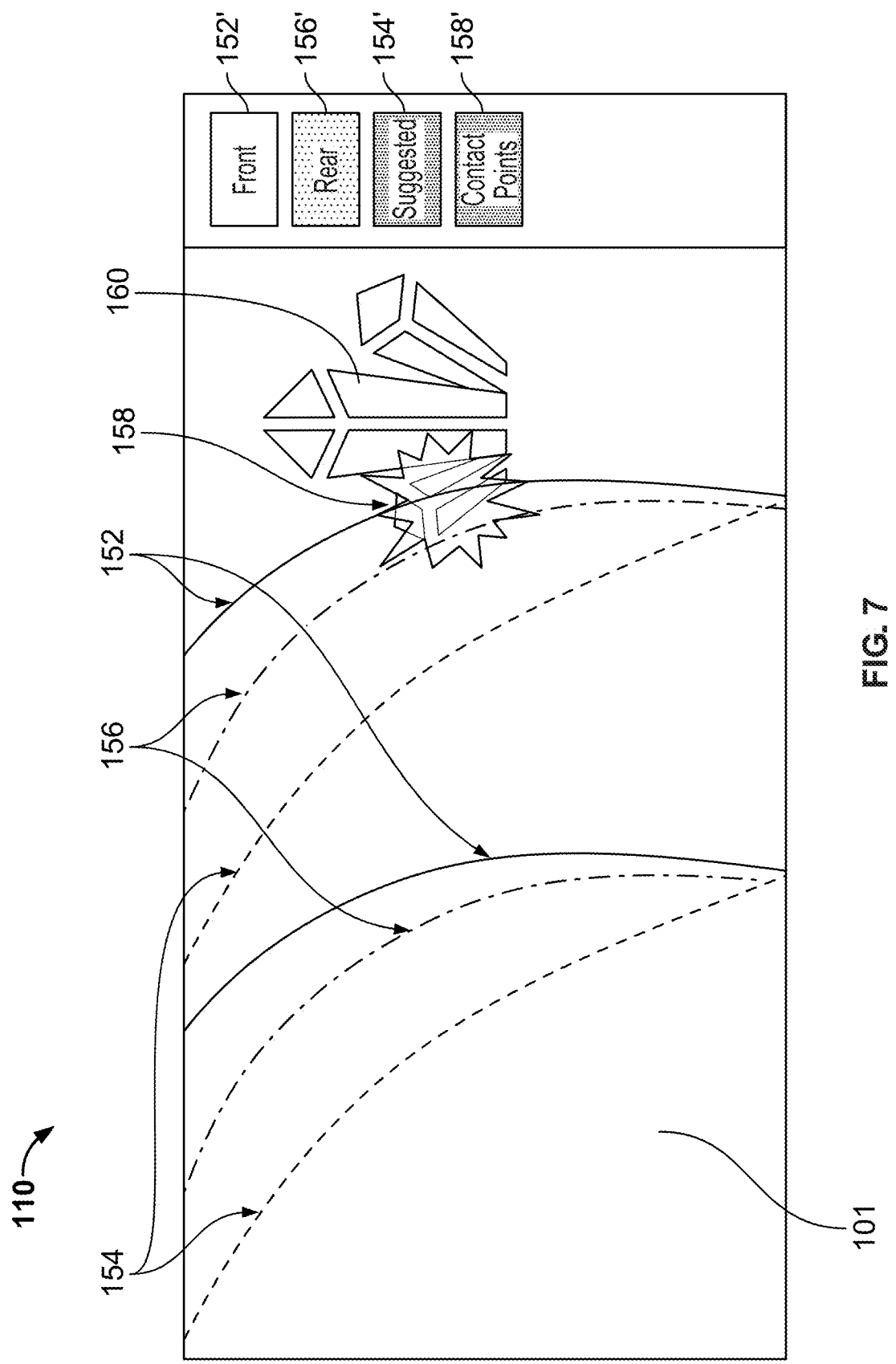
FIG. 7 shows a vehicle display of a guidance system, in accordance with some embodiments of the present disclosure.

Turning now to FIG. 7, display 110 of the vehicle 102 is illustrated and described in further detail, in accordance with an example illustration. In the illustrated example, display 110 provides a forward-looking image, e.g., directly in front of the vehicle 102. As illustrated, the display 110 may show an image or live video feed of terrain 101, with various paths 152, 154, 156 projected or overlaid upon the image/video. More specifically, a current front tire path 152 may be represented as a projected path for two tires 105, e.g., both front tires 105a of the vehicle 102 (not shown in FIG. 7). The current front tire path 152 may include the contact patch 109 (not shown in FIG. 7) of the front tires 105a, e.g., such that the current front tire path 152 is projected in a desired direction forward or backward from the position of the contact patch 109 for the front tires 105a. The current front tire path 152 may represent the path of the front tire(s) 105 based upon a steering wheel angle and position of the front tires 105 in real-time. Additionally, a current rear tire path 156 for rear tires 105b of the vehicle 102 may be separately overlaid upon the terrain 101. The current rear tire path 156 may be projected based upon steering angle of the vehicle 102 and current position of the rear tires 105b. A suggested or desired path 154 for the front tires 105a may also be illustrated and overlaid upon the terrain 101, which may represent a recommended or suggested path to divert the vehicle 102 and/or front tires 105a based upon objects or obstacles 160 detected by the vehicle 102 and/or drone 104. The desired path 154 may thus provide a "target" for a driver/operator of the vehicle 102 to direct the front tires 105a toward. As illustrated, the display 110 may also show rocks or other objects as the obstacle 160. The display 110 may also highlight potential one or more potential contact points 158 upon the obstacle 160, based upon the current paths 152 and/or 156 of the vehicle 102. The display 110 may allow selection and deselection of each of the paths 152, 154, and 156 (i.e., to allow each to be selectively displayed or hidden) by way of touchscreen buttons 152', 154' and 156' corresponding to each of the paths 152, 154, and 156. Similarly, a touchscreen button 158' may activate or hide highlighting of contact points 158 on an obstacle 160.

As noted above, the system 100 may collect path data using the drone 104 and the vehicle 102. In at least some examples, path data may be displayed using both the display 107 of the drone 104 as well as the display 110 of the vehicle 102. Continuing with the example display 110 illustrated in FIG. 7, path data in the form of images or live video collected by the drone 104 of terrain 101 may be displayed in the background of the display 110. Current and/or desired paths 152, 154, and/or 156 may be overlaid upon the image/video of the terrain 101. The various paths may be determined by controller 118 based upon, merely as examples, a position of the contact patch 109 of the relevant tire(s) 105 of vehicle 102, a steering angle of the vehicle 102, an orientation of the vehicle 102 (e.g., pitch, roll, yaw, or the like). The controller 118 may also determine dimensions of features of the terrain 101, e.g., obstacle 160, and determine a likelihood of contact based upon vehicle-specific information such as an approach angle, a breakover angle, and/or a departure angle of the vehicle. The system 100 may provide visual guidance by way of the display 110 in the form of the overlaid paths 152, 154, and/or 156, as well as via drone 104 and indicators 140, 142a, 142b, and/or 144. Accordingly, visual guidance may be provided by the drone 104 and vehicle 102 using input from the sensor(s) 106 of the drone 104 and sensor(s) 116 of the vehicle 102. The visual guidance may similarly be provided simultaneously by the display 107 of the drone 104 and the display 110 of the vehicle 102 to guide a driver to a different steering angle or the like. The controller 118, accordingly, may be configured to provide a first representation of visual guidance from outside the vehicle, e.g., in the form of directional arrows, lights, or other visual indicator, via the drone display 107, and a second representation of the visual guidance inside the vehicle 102, e.g., in the form of images of terrain 101 and/or a desired path for tire(s) 105, via display 110 within the interior 103 of the vehicle 102.

Figure 8:
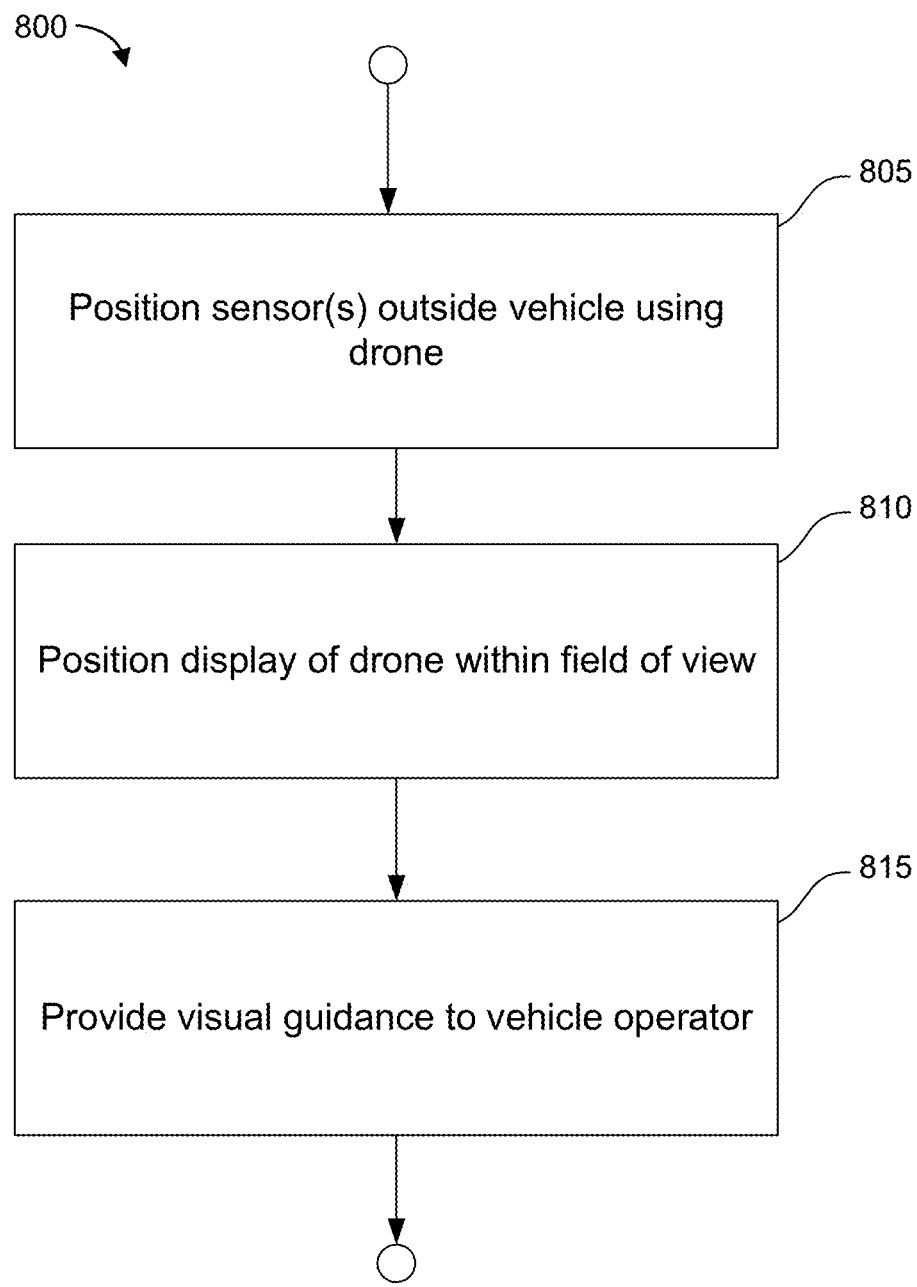
FIG. 8 illustrates a process flow diagram for an example method of providing visual guidance, e.g., using a drone, in accordance with some embodiments of the present disclosure.

Turning now to FIG. 8, an example process 800 of providing visual guidance is illustrated and described in further detail. Process 800 may begin at block 805, where a sensor may be autonomously positioned outside a vehicle using a drone such that the sensor has a line of sight to a current path of the vehicle to collect path data. For example, as described above the drone 104 may be deployed from vehicle 102, with the system 100 generally navigating the drone 104 such that that drone 104 has a line of sight to terrain 101 relevant to the vehicle 102, e.g., including contact patch 109 of the vehicle 102. As noted above, in some examples the controller 118 may maintain the drone 104 within a desired area, e.g., within the path view P to facilitate collection of path data by the sensor(s) 106 of the drone 104. The drone 104 may be kept within the desired area or zone autonomously, e.g., without requiring steering or navigation inputs from a driver/operator of the vehicle 102. Additionally, the system 100 and/or controller 118 may autonomously maintain the sensor 106 within the path view P, such that the line of sight to the current path is maintained in response to movement of the vehicle 102, e.g., along the current path.

Proceeding to block 810, process 800 may autonomously position a display of drone 104 within a field of view of the vehicle operator. For example, as discussed above the system 100 and/or controller 118 may maintain a display 107 of the drone 104 within field of view F associated with the vehicle 102. Process 800 may then proceed to block 815.

At block 815, process 800 may determine, using a controller, visual guidance from the path data and provide the visual guidance to a vehicle operator. Controller 118 may, as discussed above, determine visual guidance based upon a position of contact patch 109 of one or more tires 105 of the vehicle 102, an orientation of the contact patch 109, a direction of the one or more tires 105, a steering angle of the vehicle 102, or a vehicle orientation (e.g., pitch, roll, yaw, etc.). Additionally, visual guidance may be provided to a vehicle operator from outside the vehicle 102, e.g., in addition to being provided from a location inside an interior 103 of the vehicle 102. For example, as discussed above a display 107 of drone 104 may display directions to indicate the operator should move the vehicle 102 forward/left/right/stop/backward using directional arrows, colors, or the like. At the same time or alternatively, more detailed visual guidance may be provided by display 110 within the interior 103 of the vehicle 102.

It should be noted that the process 800 is merely illustrative and various modifications may be made. Merely by way of example, visual guidance may be provided within an interior 103 of the vehicle 102 instead of being displayed from outside the vehicle, e.g., on drone 104.

The foregoing description includes exemplary embodiments in accordance with the present disclosure. These examples are provided for purposes of illustration only, and not for purposes of limitation. It will be understood that the present disclosure may be implemented in forms different from those explicitly described and depicted herein and that various modifications, optimizations, and variations may be implemented by a person of ordinary skill in the present art, consistent with the following claims.

What is claimed is:

1. A visual guidance system, comprising:
    a drone comprising a sensor, the drone configured to autonomously position the sensor outside a vehicle with a line of sight to a current path of the vehicle to collect path data by:
    determining a field of view of a vehicle operator;
    determining a view angle of a contact patch position of one or more tires of the vehicle;
    determining an overlap region of the field of view and the view angle; and
    autonomously positioning the drone in the overlap region; and
    a controller in communication with the sensor and configured to provide visual guidance to the vehicle operator based on the path data.

2. The visual guidance system of claim 1, wherein the visual guidance includes a direction to guide the vehicle.

3. The visual guidance system of claim 1, wherein the autonomous positioning of the drone in the overlap region positions a display of the drone within the field of view of the vehicle operator.

4. The visual guidance system of claim 1, wherein the visual guidance includes an image of the current path and a representation of a desired path overlaid upon the image.

5. The visual guidance system of claim 1, further comprising a vehicle display installed within the vehicle, the vehicle display configured to provide the visual guidance to the vehicle operator.

6. The visual guidance system of claim 1, wherein the current path includes a contact between one or more tires of the vehicle and a surface being traversed by the vehicle.

7. The visual guidance system of claim 1, wherein the drone is configured to autonomously maintain its position in the overlap region such that the sensor maintains the line of sight to the current path in response to movement of the vehicle along the current path.

8. The visual guidance system of claim 1, wherein the vehicle is configured to determine a position of the drone and provide positioning instructions to the drone in response to the determined position of the drone, the positioning instructions including one or more of:
    a vehicle position of the vehicle; and
    an obstacle position of one or more drone obstacles detected by the vehicle.

9. The visual guidance system of claim 1, wherein the controller is configured to determine the visual guidance based upon one or more of the contact patch position of the one or more tires of the vehicle, a contact patch orientation, a direction of the one or more tires, a steering angle of the vehicle, or a vehicle orientation.

10. The visual guidance system of claim 1, wherein the path data includes one or more images of the current path.

11. The visual guidance system of claim 1, wherein:
    the drone further comprises a display configured to display multiple visual indicators; and
    the controller is configured to provide the visual guidance to the vehicle operator based on the path data by displaying at least one of the multiple visual indicators on the display of the drone.

12. A visual guidance system, comprising:
    a drone comprising a sensor and a drone display the drone configured to autonomously position itself outside a vehicle such that the sensor has a path line of sight to a current path of the vehicle to collect path data by:
    determining a field of view of an operator position within the vehicle;
    determining a view angle of a contact patch position of one or more tires of the vehicle;
    determining an overlap region of the field of view and the view angle; and
    autonomously positioning the drone in the overlap region; and
    a controller in communication with the sensor and configured to provide visual guidance based on the path data;
    wherein the controller is configured to provide a first representation of visual guidance from outside the vehicle via the drone display; and
    wherein the controller is configured to provide a second representation of the visual guidance inside the vehicle via an interior vehicle display.

13. The visual guidance system of claim 12, wherein the drone is configured to autonomously maintain its position in the overlap region such that the sensor maintains a line of sight to a current path in response to movement of the vehicle.

14. The visual guidance system of claim 12, wherein the visual guidance includes a direction to guide the vehicle from a current path to a desired path.

15. A method, comprising:
    autonomously positioning a sensor outside a vehicle using a drone such that the sensor has a line of sight to a current path of the vehicle to collect path data by:
    determining a field of view of a vehicle operator;
    determining a view angle of a contact patch position of one or more tires of the vehicle;
    determining an overlap region of the field of view and the view angle; and
    autonomously positioning the drone in the overlap region;
    using a controller, determining visual guidance from the path data; and
    providing the visual guidance to the vehicle operator.

16. The method of claim 15, wherein the autonomous positioning of the drone in the overlap region autonomously positions a display of the drone within the field of view of the vehicle operator.

17. The method of claim 15, further comprising providing the visual guidance to the vehicle operator using a vehicle display installed within the vehicle.

18. The method of claim 15, further comprising autonomously maintaining the drone in the overlap region such that the sensor maintains the line of sight to the current path in response to movement of the vehicle along the current path.

19. The method of claim 15, wherein the visual guidance is determined based upon one or more of the contact patch position of the one or more tires of the vehicle, a contact patch orientation, a direction of the one or more tires, a steering angle of the vehicle, or a vehicle orientation.

* * * * *